United States Patent [19]

Landy et al.

[11] Patent Number: 4,809,420
[45] Date of Patent: Mar. 7, 1989

[54] METHOD AND APPARATUS FOR BACKING UP MANDREL EXIT HOLES IN KNUCKLE STRUCTURES

[75] Inventors: Michael A. Landy, Bellevue; Todd L. Thompson; Larry L. Wiemann, both of Kent, all of Wash.

[73] Assignee: Fatigue Technology, Inc., Seattle, Wash.

[21] Appl. No.: 133,631

[22] Filed: Dec. 16, 1987

[51] Int. Cl.[4] .................. B21D 39/00; B23P 11/02
[52] U.S. Cl. ..................... 29/523; 29/281.1; 29/281.5; 29/281.6; 29/283.5; 29/559; 72/370
[58] Field of Search ............... 29/523, 283.5, 281.5, 29/281.6, 283, 559; 269/272, 234, 43; 72/370, 460, 461, 391, 393

[56] References Cited

U.S. PATENT DOCUMENTS

| 608,178 | 8/1898 | Cock . | |
|---|---|---|---|
| 2,092,372 | 9/1937 | Goeller | 269/234 X |
| 2,185,483 | 1/1940 | Ward . | |
| 2,228,930 | 1/1941 | Robinson | 29/283.5 X |
| 2,521,505 | 9/1950 | Doyle | 269/47 X |
| 2,658,718 | 11/1953 | Walker . | |
| 2,778,352 | 1/1957 | Kimberly . | |
| 2,790,620 | 4/1957 | Rankin . | |
| 2,903,309 | 9/1959 | Brand | 29/523 X |
| 2,958,127 | 11/1960 | Johnson | 29/523 |
| 2,958,940 | 11/1960 | Murphy | 269/47 X |
| 3,051,474 | 8/1962 | Helda et al. | 269/234 |
| 3,166,828 | 1/1965 | Tupper | 29/523 X |
| 3,190,134 | 6/1965 | Sadler et al. | 29/523 X |
| 3,292,900 | 12/1966 | Pettersen . | |
| 3,297,302 | 1/1967 | Spears, Jr. . | |
| 3,369,285 | 2/1968 | Heim . | |
| 3,372,452 | 3/1968 | Firth et al. . | |
| 3,428,338 | 2/1969 | Corwin | 285/39 |
| 3,445,908 | 5/1969 | Straub | 29/523 X |
| 3,555,673 | 1/1971 | Summerlin . | |
| 3,566,662 | 3/1971 | Champoux | 72/370 |
| 3,568,303 | 3/1971 | Ito | 72/370 X |
| 3,571,907 | 3/1971 | Watson | 29/523 X |
| 3,641,865 | 2/1972 | Swindt et al. . | |
| 3,693,247 | 9/1972 | Brown | 29/512 |
| 3,778,090 | 12/1973 | Tobin | 285/222 |
| 3,786,555 | 1/1974 | Robertson | 29/523 X |
| 3,805,578 | 4/1974 | King, Jr. | 72/370 |
| 3,828,415 | 8/1974 | Kammeraad et al. | 29/525 X |
| 3,835,688 | 9/1974 | King, Jr. | 72/370 |
| 3,875,649 | 4/1975 | King, Jr. | 29/418 |
| 3,879,980 | 4/1975 | King, Jr. | 72/393 |
| 3,913,421 | 10/1975 | Hawkins | 76/107 S |
| 3,934,325 | 1/1976 | Jaffe | 29/243.52 |
| 3,961,149 | 6/1976 | Robertson et al. | 29/523 X |
| 3,967,840 | 7/1976 | McFall | 285/222 |
| 4,164,807 | 8/1979 | King, Jr. | 29/523 |
| 4,204,312 | 5/1980 | Tooker | 29/523 |
| 4,405,256 | 9/1983 | King, Jr. | 403/408 |
| 4,433,567 | 2/1984 | Mead | 72/342 |
| 4,460,316 | 7/1984 | Partington | 416/217 |
| 4,471,643 | 9/1984 | Champoux et al. | 72/391 |

FOREIGN PATENT DOCUMENTS

| 2719451 | 11/1978 | Fed. Rep. of Germany | 269/234 |
|---|---|---|---|
| 9264 | 5/1967 | Japan | 72/370 |
| 729989 | 5/1955 | United Kingdom | 29/523 |
| 796659 | 6/1958 | United Kingdom | 29/523 |

Primary Examiner—Charlie T. Moon
Attorney, Agent, or Firm—Joan H. Pauly

[57] ABSTRACT

A pair of back-up members (32, 42) are inserted between adjacent projection (4) of a workpiece (2). Openings (36, 46) through the members (32, 42) are aligned with holes (6) through the projections (4). A wedge (54) is driven between the members (32, 42) and forces them against outer surface portions (5) of the projections (4) surrounding the holes (6) and radial end surfaces (9) of bushings (7) positioned in the holes (6). A mandrel (62) is pulled through the bushings (7) and the openings (36, 46) to install the bushings (7). Another embodiment of back-up members (132, 142) has a plurality of openings (136, 146) for use with a workpiece (102) having a plurality of rows of axially aligned holes (106). This embodiment is preferably used with a locator (70) which has two rods (74) for holding the holes (106) and openings (136, 146) in accurate alignment.

26 Claims, 8 Drawing Sheets

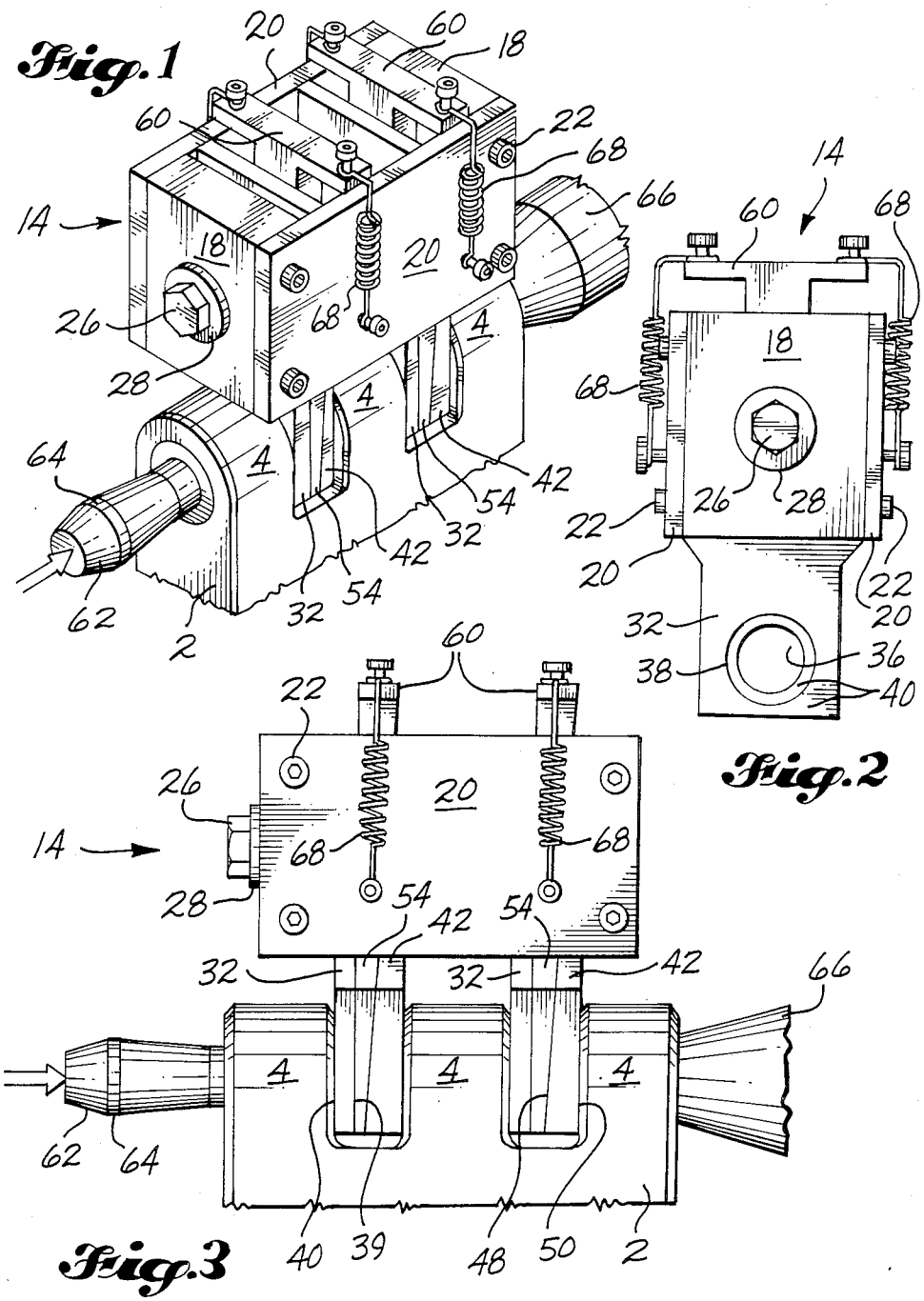

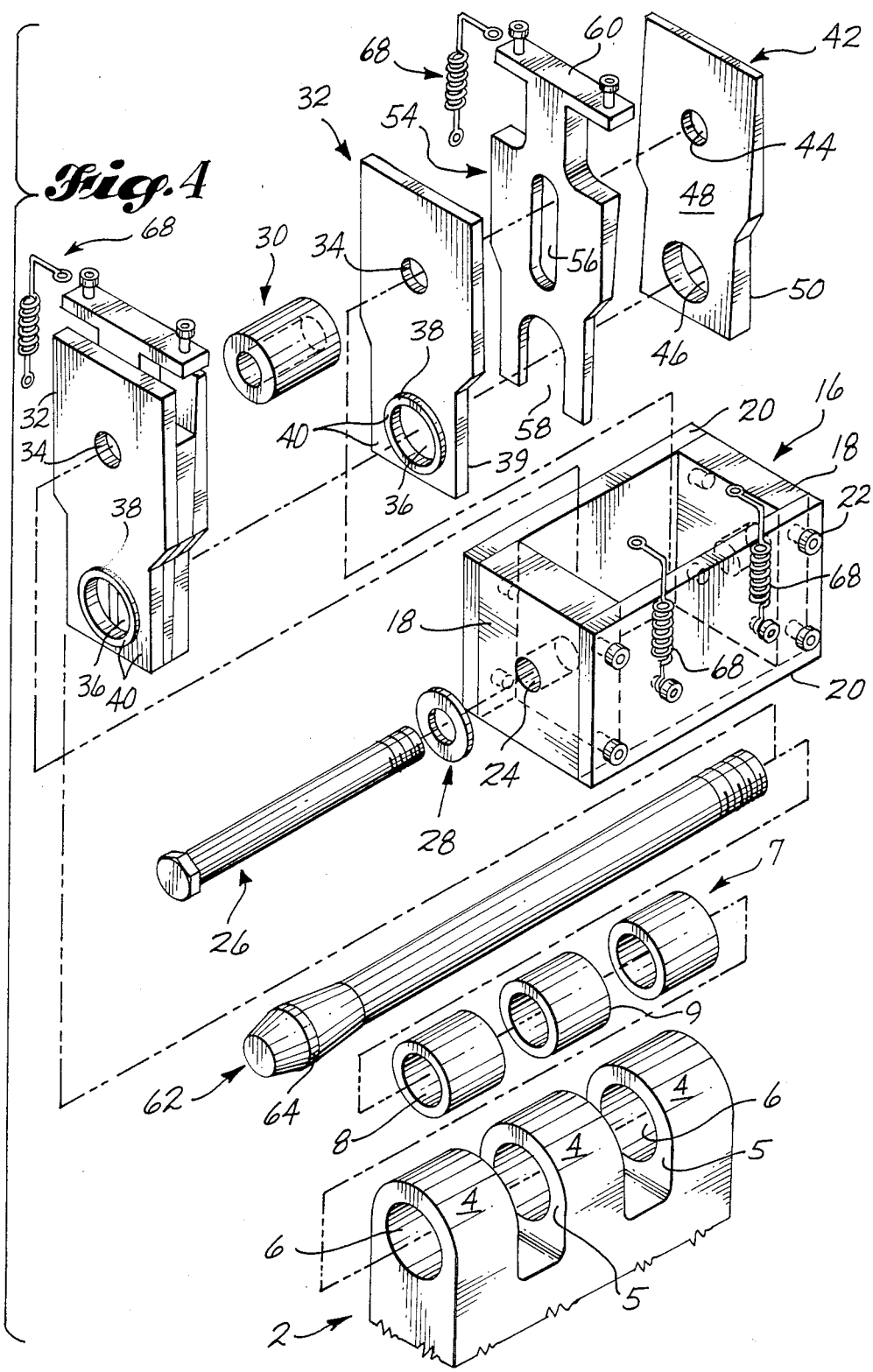

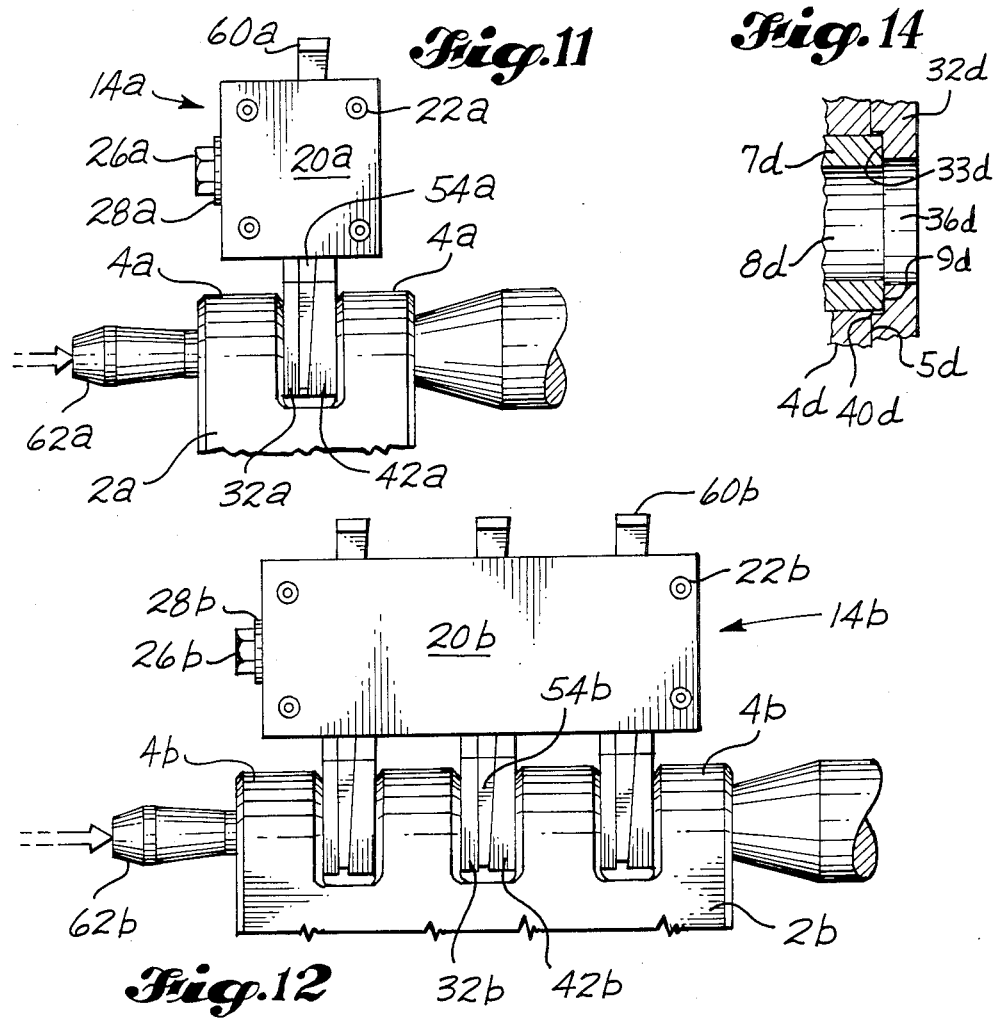
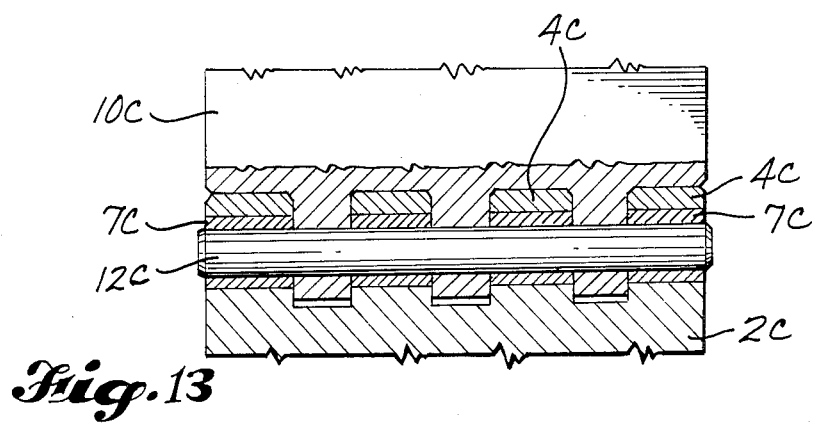

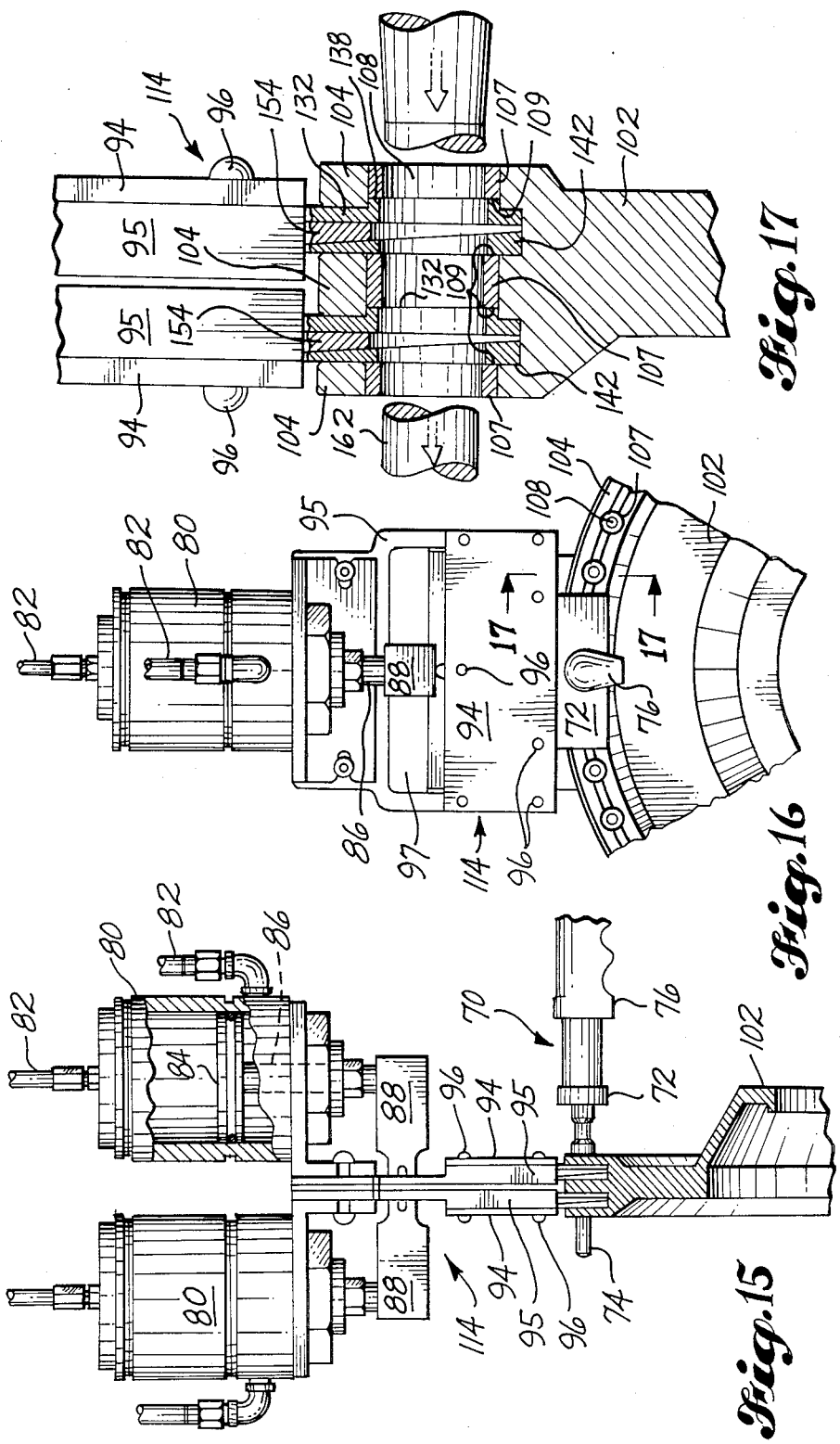

METHOD AND APPARATUS FOR BACKING UP MANDREL EXIT HOLES IN KNUCKLE STRUCTURES

DESCRIPTION

1. Technical Field

This invention relates to methods and apparatus for working holes in knuckle-like structures and, more particularly, to such a method and apparatus in which a pair of back-up members are positioned between adjacent knuckles and urged by a wedge against surfaces surrounding the holes, and a mandrel is passed through the holes in the structure and aligned openings in the back-up members and wedge to install bushings in the holes and/or coldwork the holes.

2. Background Art

There are a number of situations in which it is necessary or desirable to coldwork and/or install bushings in axially aligned holes that extend through a plurality of axially spaced projections, in the manner of the hinge pin holes through the knuckles of a hinge member. One such situation is in the manufacture of turbine rotor and blade assemblies. A common arrangement is to provide the blade roots and the rotor with knuckle-like structures and to attach the blades to the rotor by means of pins that extend through axial holes in the knuckles. In this type of arrangement, it is often desirable to provide bearing surfaces in some or all of the knuckle holes by installing bushings in the holes. The current standard method of installing a bushing in a hole through a structure is to pass a mandrel through the bushing to expand it into tight engagement with the hole.

A major problem which has been encountered in connection with installing bushings in knuckle-type structures is that it is very difficult to provide proper backing for the inner faces of the knuckle members. Such backing is necessary to help prevent longitudinal shifting of the bushings and deformation or extruding of the mandrel exit ends of the bushings and/or holes. Inserting a back-up member of fixed dimensions between two knuckles does not provide a reliable solution to the problem since the back-up member may not completely fill the space between the two knuckles. Even in workpieces of standard dimensions, the space between the knuckles will vary within acceptable tolerances. Fixed sized back-up members have no means for compensating for tolerance gaps and, thus, do not reliably provide a complete load path and firm backing for the edges of the holes.

Examples of the type of turbine rotor and blade assembly described above are shown in U.S. Pat. Nos. 2,790,620, granted Apr. 30, 1957, to A. W. Rankin; 3,292,900, granted Dec. 20, 1966, to J. Pettersen; 3,297,302, granted Jan. 10, 1967, to E. W. Spears, Jr.; and 4,460,316, granted Jul. 17, 1984, to A. J. Partington. Another type of attachment of turbine blades to a rotor is shown in U.S. Pat. No. 2,658,718, granted Nov. 10, 1953, to D. N. Walker. In the Walker arrangement, slightly tapered locking pins are inserted or driven into generally circular bores formed by corrugations on adjacent blade walls.

U.S. Pat. No. 2,185,483, granted Jan. 2, 1940, to F. T. Ward, discloses a method of expanding high manganese steel bushings and sizing and hardening holes in mechanical parts. In FIGS. 7-9 of the patent, the positioning and expanding of bushings in a part having a clevis at the end is shown. These Figs. illustrate the use of an anvil having an over-hanging portion that lies between the clevis arms and has an opening therethrough which aligns with the openings in the bushings. With the anvil in position, a drift pin is driven through the bushings to expand the bushings and lock them in place.

U.S. Pat. Nos. 3,786,555, granted Jan. 22, 1974 to J. M. Robertson et al.; and 3,961,149, granted June 1, 1976, to the same inventors, were issued on related parent and continuation-in-part applications. Each of these patents discloses bonding an aluminum alloy sleeve of bearing material to the inner circumferential surface of the end of a connecting rod. The opening in the connecting rod is heated, and the sleeve is inserted into the opening and is in turn heated by the opening. A ram is inserted into the end of the rod to expand the bearing material radially and elongate it axially to form a sleeve type bearing or bushing. U.S. Pat. No. 3,369,285, granted Feb. 20, 1968, to L. R. Heim discloses apparatus for manufacturing bearings in which a ball bearing member with an axial opening is expanded in a socket by a punch mechanism. U.S. Pat. No. 3,571,907, granted Mar. 23, 1971, to R. D. Watson, discloses a method of cladding the inside surface of a pressure tube for nuclear reactors with an aluminum sleeve to reduce hydrogen pickup. The tube and sleeve and a ram are heated, and then the ram is lowered into the sleeve to expand the sleeve against the walls of the tube.

Four related patents that were granted to J. O. King, Jr., disclose a system in which a mandrel is pulled through a seamless sleeve to expand the sleeve in a hole and enlarge the hole. These patents are U.S. Pat. Nos. 3,835,688, granted Sept. 17, 1974; 3,875,649, granted Apr. 8, 1975; 3,879,980, granted Apr. 29, 1975; and 4,164,807, granted Aug. 21, 1979. In the system, the expanded sleeve is left in the hole, which extends through two structures being joined, and a fastener is extended through the sleeve. The first patent specifies a method of sizing holes and states that the sleeve is left in the hole to limit rebound of the hole. The second patent specifies a method of coldworking a hole in a workpiece by expanding it beyond its elastic limit and focuses on the fracturability of the head of the sleeve to remove the head after the sleeve is expanded. The third patent specifies a system for enlarging holes and focuses on the structure of the back-up member. The back-up member has a lip which extends slightly into the hole and has an annular support surface that abuts the end of the sleeve. King describes the back-up member as continuously supporting the sleeve so that the sleeve does not shift longitudinally and is not deformed by having a lip formed on its end. The back-up member is expanded along with the sleeve during the expansion procedure and is then discarded. The last of the four patents specifies a method of forming coldworked joints and shows, in FIGS. 5 and 11, a tapered back-up member that extends into countersunk holes. U.S. Pat. No. 4,405,256, granted Sept. 20, 1983, to J. O. King, Jr., discloses a fastener joint for composite material workpieces. The joint is formed by nonelastically expanding a sleeve in a hole in the workpiece and compressing an annular cushion between the hole sidewall and the sleeve. The fastener is then inserted into the sleeve to maintain the sleeve expanded and the cushion compressed.

U.S. Pat. Nos. 3,566,662, granted Mar. 2, 1971, to L. A. Champoux; and 4,471,643, granted Sept. 18, 1984, to R. L. Champoux et al., disclose systems for prestressing (coldworking) fastener holes. In each of the systems disclosed in these two patents, a split sleeve is positioned around the narrow portion of a mandrel and the mandrel is passed through the hole to position the sleeve therein. Then, the wide portion of the mandrel is pulled back through the sleeve to expand the sleeve and prestress the hole. The sleeve is retained against longitudinal movement by a back-up member which has a recess for accommodating the protruding end of the sleeve. U.S. Pat. No. 3,555,673, granted Jan. 19, 1971, to F. A. Summerlin, discloses a method of forming an electrical connector socket in which a headed tubular member is positioned in an aperture in a support and a mandrel is pulled through the member to fix it to the support.

U.S. Pat. No. 3,693,247, granted Sept. 26, 1972, to C. K. Brown discloses a method of securing structural members together in which a mandrel is driven into a sleeve to expand the sleeve radially and coldwork the hole to "obviate" fatigue failure. The sleeve and mandrel form a composite fastener. U.S. Pat. No. 4,433,567, granted Feb. 28, 1984, to A. R. Mead, discloses a method for working holes to increase their fatigue life. A sleeve with a shape memory is expanded in a fastener hole by forcing a mandrel through the sleeve. Then, the expanded sleeve is warmed so that it returns to its shape and can be removed from the hole. Systems in which a punch, ram, or similar mechanism is used to expand the end of a tube or a sleeve-like member to secure it in an aperture in a structure are disclosed in U.S. Pat. Nos. 608,178, granted Aug. 2, 1898, to W. R. Cock; 2,958,127, granted Nov. 1, 1960, to A. E. F. Johnson; 3,372,452, granted Mar. 12, 1968 to D. Firth et al; 3,778,090, granted Dec. 11, 1973, to M. F. Tobin; 3,913,421, granted Oct. 21, 1975, to C. O. Hawkins; and 4,204,312, granted May 27, 1980, to P. G. Tooker.

Other types of systems for joining tubular or sleeve-like members to holes are disclosed in U.S. Pat. Nos. 3,428,338, granted Feb. 18, 1969, to H. L. Corwin; No 3,967,840, granted Jul. 6, 1976, to R. A. McFall; 3,641,865, granted Feb. 15, 1972, to J. K. Swindt et al.; 2,778,352, granted Jan. 22, 1957, to A. C. Kimberly; and 3,828,415, granted Aug. 13, 1974, to J. A. Kammeraad et al. Corwin discloses a method of joining a tube end to a bore in which the tube is first expanded with a roller-type mandrel and then further expanded with impact tools that abut and exert force on the inner end of the tube. McFall discloses a system in which a tube end is connected to a metallic member by use of a roller-type mandrel. Swindt et al. disclose a system in which a sealing shear fastener is installed in a fastener hole by exerting an axial thrust on a sleeve which surrounds the fastener to expand the sleeve axially down into the hole and radially to lock the fastener in the hole and seal the hole. Kimberly and Kammeraad et al. disclose systems for rebuilding valve guides in internal combustion engines. In the Kimberly system, the valve boss is heated and the sleeve insert is cooled to provide a shrink fit. In the Kammeraad et al. system, a slitted tubular member is forced into the reamed valve guide to provide a press fit.

U.S. Pat. No. 3,934,325, granted Jan. 27, 1976, to D. M. Jaffe, discloses gun-type apparatus for setting blind fasteners. The fastener is positioned in aligned holes in the structures to be fastened together. The enlarged outer head of the mandrel is passed through the fastener. The movement of the mandrel through the fastener positions a sleeve located on the narrow portion of the mandrel inside the fastener. Then the forward head portion of the mandrel and a rear resilient biasing member are pulled together to pull the structures together and expand the forward portion of the blind fastener which extends beyond the forward structure. During this procedure, a plurality of fingers on the front end of the sleeve ride up on the tapered head of the mandrel to increase its effective diameter. When the forward end of the fastener has been set by expanding, the mandrel is moved forwardly relative to the sleeve so that the sleeve and mandrel may be withdrawn from the fastener.

The above patents and the prior art that is cited therein should be carefully considered for the purpose of putting the present invention into proper prospective relative to the prior art.

Disclosure of the Invention

The invention is directed toward methods and apparatus for working holes in spaced projections of a workpiece. An aspect of the invention is a method of providing firm back-up for a mandrel exit end of a hole located between two axially spaced projections of a workpiece, said hole extending axially through one of the projections. According to this aspect of the invention, the method comprises inserting between the projections a pair of back-up members having confronting faces that define a space therebetween which tapers inwardly toward the projections. The members are positioned to align axial openings therethrough with the hole, and to align abutment surfaces thereof with outer surface portions of the projections. A wedge is driven between the confronting faces to force the abutment surfaces firmly against the outer surface portions of the projections. An opening through the wedge is aligned with the hole and the openings through the back-up members.

The method may be used advantageously in situations in which the hole is formed by an axial hole through a bushing or sleeve positioned in an axial opening through one of the projections, as well as in situations in which the hole is formed directly in the workpiece. When the hole is formed in a bushing, the step of positioning the back-up members preferably includes aligning a portion of the abutment surfaces with a radial end surface of the bushing. The portion of the abutment surfaces that abuts the radial end surface of the bushing may be positioned to abut the bushing in a flush, over-flush, or under-flush position. In the last case, said portion of the abutment surfaces is positioned to project into the opening in the projection to back up the bushing in an under-flush position.

Another aspect of the invention is a method of installing a bushing in an axial hole that extends axially through one of two axially spaced projections of a workpiece and of providing firm back-up for a radial end surface of the bushing at a mandrel exit end of the hole. According to this aspect, the method comprises positioning the bushing in the hole, and inserting a pair of back-up members and driving a wedge as described above. The abutment surfaces of the back-up members are aligned with outer surface portions of the projections and said radial end surface of the bushing, and the wedge forces the abutment surfaces firmly against the outer surface portions. The method also includes then passing a mandrel through the bushing and the openings through the back-up members to radially and circumferentially expand the bushing. While the mandrel is being passed, the abutment surfaces firmly abut said radial end surface. When a high degree of accuracy in the sizing of the bushing is required, the method preferably further comprises reaming the bushing after passing the mandrel, to size the bushing. When it is desirable to coldwork the hole in the workpiece, preferably the step of passing the mandrel radially and circumferentially expands the hole to coldwork the hole.

The method aspects of the invention also include a method of installing bushings in axially aligned holes that extend axially through a plurality of axially spaced projections of a workpiece and of providing back-up as described above. This aspect of the invention comprises positioning a bushing in each of the holes. A pair of back-up members is inserted between each adjacent pair of projections, and a wedge is driven between the confronting faces of the members, as described above. A mandrel is then pulled through the bushings and the openings through the back-up members to radially and circumferentially expand the bushings.

A further method aspect of the invention is a method of installing bushings in a plurality of rows of axially aligned holes that extend axially through a plurality of axially spaced projections of a workpiece and of providing firm back-up for radial end surfaces of the bushings at mandrel exit ends of the holes. The method comprises positioning a bushing in each of the holes and inserting, between each adjacent pair of projections, a pair of back-up members having confronting faces that define a space therebetween which tapers inwardly toward the projections. The back-up members are positioned to align, in each of the rows, axial openings through the members with the holes. In each of two of the rows, a locating rod is positioned to extend through each of the holes in the row to hold the openings in the back-up members in accurate alignment with the holes in each of the rows. The positioning of the back-up members also includes aligning, in at least each row other than said two rows, abutment surfaces of the members with said radial end surfaces of the bushings and outer surface portions of the projections surrounding the holes. After the back-up members and rods are positioned, a wedge is driven between the confronting faces of the back-up members to force the abutment surfaces firmly against the outer surface portions of the projections, and in each of the rows, an opening through the wedge is aligned with the holes and the openings in the back-up members. After the wedge is driven, a mandrel is pulled through the bushings and the openings through the back-up members in each of the rows in which a locating rod has not been positioned, to radially and circumferentially expand the bushings. While the mandrel is being pulled, the abutment surfaces firmly abut said radial end surfaces. The locating rods are removed from said two rows, and each rod is repositioned to extend through each hole in a different row. A mandrel is pulled through the bushings in each of said two rows to radially and circumferentially expand the bushings. This aspect of the invention has the advantage of maximizing the efficiency of installing bushings in axial holes in a workpiece having multiple rows of axially aligned holes extending through axially spaced projections.

An apparatus aspect of the invention is apparatus for providing firm back-up for a mandrel exit end of a hole 5 located between two axially spaced projections of a workpiece, said hole extending axially through one of the projections. The apparatus comprises a pair of back-up members having outer abutment surfaces and inner confronting faces. Each member has an opening extending axially therethrough. The members are shaped and dimensioned to be insertable between the projections with their confronting faces defining a space therebetween which tapers inwardly toward the projections, with the openings aligned with the hole, and with the abutment surfaces aligned with outer surface portions of the projections. The apparatus also includes a wedge having an opening extending therethrough. The wedge is shaped and dimensioned to force the abutment surfaces firmly against the outer surface portions, and to align the opening in the wedge with the openings in the back-up members, when the wedge is driven between the confronting faces.

When a bushing is to be installed in the hole, the abutment surface of one of the members is preferably shaped and dimensioned to abut a radial end surface of the bushing. In apparatus with this feature, said one of the members may be provided with an annular flange formed thereon positioned and dimensioned to project into the hole to abut the radial end surface of the bushing in an under-flush position. Alternatively, the member may have a recess formed therein for receiving the radial end surface of the bushing in an over-flush position. A third alternative would be to form the member to abut the bushing in a flush position.

Another preferred feature of the invention is providing one of the members with a confronting face and outer abutment surface that are substantially parallel and providing the other member with a confronting face that slopes in an inward direction away from its outer abutment surface. This feature simplifies the manufacture and cost of the back-up members and the wedge by minimizing the number of surfaces which must be machined.

Another apparatus aspect of the invention is apparatus for installing a bushing in an axial hole that extends axially through one of two axially spaced projections of a workpiece. The apparatus includes a pair of back-up members and a wedge, as described above. The apparatus also includes a mandrel and means for passing the mandrel through the bushing and the openings in the back-up members to radially and circumferentially expand the bushing.

Still another apparatus aspect of the invention is apparatus for installing bushings in a plurality of rows of axially aligned holes that extend axially through a plurality of axially spaced projections of a workpiece. The apparatus comprises a pair of back-up members corresponding to each pair of adjacent projections. The members have outer abutment surfaces and inner confronting faces. Each member has an opening extending axially therethrough for each row of holes. The members are shaped and dimensioned to be insertable between the projections in the corresponding pair of projections with their confronting faces defining a tapered space as described above, with the openings aligned with the holes in the corresponding rows, and with the abutment surfaces aligned with radial end surfaces of the bushings and outer surface portions of the projections. The apparatus includes a wedge corresponding to each pair of back-up members. The wedge has an opening extending therethrough for each row of holes and is shaped and dimensioned as described above. The apparatus also includes a locator having two rods each of which is positioned and dimensioned to extend through the holes in one of the rows, to hold the openings and the holes in each of the rows in accurate alignment. The apparatus further includes a mandrel and means for passing the mandrel through the bushings and the openings in the back-up members in each row to radially and circumferentially expand the bushings.

In its preferred form, the locator comprises a base having a first side from which the rods project, and an opposite second side from which a handle projects. This preferred form has the advantages of being relatively simple in structure, inexpensive to manufacture, and easy to operate.

The method and apparatus of the invention solve the problem discussed above of providing proper backing for the inner faces of knuckle members when holes through the knuckle members are being worked. By use of the method and apparatus of the invention, a complete load path is created between the knuckle members to reliably and accurately provide firm backing. The apparatus of the invention is relatively simple, and easy and inexpensive to manufacture and maintain. The method of the invention is efficient and easy to carry out and readily lends itself to automated systems. These advantages of the method and apparatus of the invention are enhanced by the great versatility of the method and apparatus. The invention may be used to coldwork and/or install bushings or sleeves in holes in axial projections of a workpiece. When bushings or sleeves are installed, they may be installed in flush, over-flush, or under-flush positions. In addition, the method and apparatus are readily adaptable to various workpiece configurations, from a single axial hole extending through one of two projections to a multiplicity of aligned holes arranged in a plurality of rows. The latter configuration is commonly found in knuckle-like structures for attaching blade roots to the rotor of a turbine.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of a first preferred embodiment of the invention being used to install bushings in a workpiece.

FIG. 2 is a side view of the back-up apparatus shown in FIG. 1.

FIG. 3 is a front elevational view of the apparatus and workpiece shown in FIG. 1.

FIG. 4 is an exploded pictorial view of the apparatus and workpiece shown in FIGS. 1 and 3.

FIG. 11 is like FIG. 3 except that it shows a modification of the first preferred embodiment.

FIG. 12 is like FIG. 3 except that it shows a second modification of the first preferred embodiment.

FIG. 13 is a sectional view of an assembled workpiece into which bushings have been installed in accordance with the invention.

FIG. 14 is a fragmentary sectional view illustrating a modified form of the back-up members.

FIG. 15 is a side elevational view of a second preferred embodiment of the invention being used to install bushings in a turbine rotor, with parts shown in section.

FIG. 16 is a front elevational view of the apparatus and rotor shown in FIG. 15.

FIG. 17 is a sectional view taken substantially along the line 17—17 in FIG. 16 and illustrating the movement of the mandrel through a row of holes in the workpiece, with parts shown in elevation.

BEST MODES FOR CARRYING OUT THE INVENTION

Figure 5:
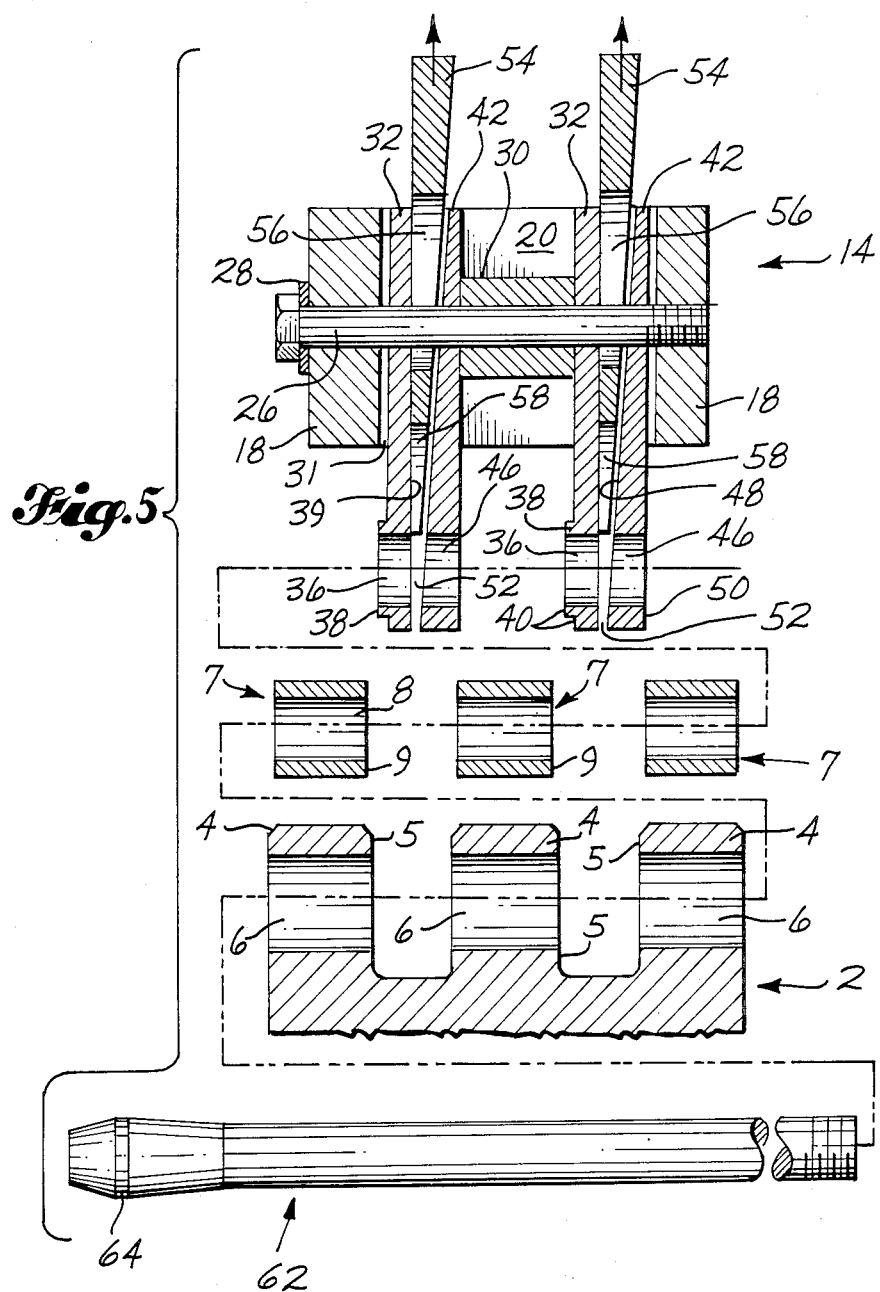
FIG. 5 is a partially exploded sectional view of the apparatus and workpiece shown in FIGS. 1, 3, and 4, with the back-up apparatus shown assembled and parts shown in elevation.

The drawings show apparatus that is constructed according to the invention and that also constitutes the best modes of the apparatus of the invention currently known to the applicant. The drawings also illustrate the best modes for carrying out the method the invention currently known to the applicant. In the drawings, the method and apparatus of the invention are shown being used to install bushings in axially aligned holes that extend axially through a plurality of spaced projections of a workpiece. FIGS. 15-18 illustrate the installation of bushings in the portion of a turbine rotor structure 102 that receives the turbine blade roots. It is anticipated that the primary application of the invention will be in connection with the installation of bushings in the types of structures shown in the drawings, and particularly in the type of turbine rotor structure shown in FIGS. 15-18. However, it is of course to be understood that the method and apparatus of the invention may also be used to advantage in connection with other types of structures and other types of hole-working systems. The method and apparatus of the invention may be used advantageously in any situation in which a mandrel exit end of a hole is located between two axially spaced portions of a workpiece.

FIGS. 1-10 illustrate a first preferred embodiment of the method and apparatus of the invention. In FIGS. 1-9, back-up apparatus 14 is illustrated being used to install bushings 7 in axial holes or openings 6 in a workpiece 2. The holes 6 extend axially through knuckle-like projections 4 formed on the workpiece 2. The term "axial" and the like are used herein to indicate the direction of the axis of a pin 12c (See FIG. 13) positioned to extend through the holes 6 through the projections 4. Referring to FIGS. 1 and 4-10, each of the bushings 7 is formed in the conventional manner with an axial hole 8 extending therethrough and opposite annular radial end surfaces 9. The projections 4 have outer radial surface portions 5 surrounding the holes 6 into which the bushings 7 are placed and facing the spaces between the projections 4.

The back-up apparatus 14 shown in FIGS. 1-9 includes a housing 16 formed by two opposite end blocks 18 and two opposite side plates 20 which are secured to the end blocks 18 by suitable fasteners 22. See FIGS. 1-4. A bolt 26 is provided for mounting the other portions of the apparatus 14. The bolt 26 extends through openings 24 in the end blocks 18 and is secured thereto by a threaded connection to one of the blocks 18. Preferably, the head end of the bolt 26 is provided with a washer 28.

The apparatus 14 also includes two sets of back-up members 32, 42 which are mounted on the bolt 26. The two sets of back-up members 32, 42 correspond to the two spaces between the projections 4 of the workpiece 2, or in other words, to each of the two adjacent pairs of projections 4. A spacer 30 is also mounted on the bolt 26 to maintain the two sets of back-up members 32, 42 properly spaced apart the width of the middle projection 4. The spacer 30 may be sized to provide gaps 31 along the bolt 26 to allow the positions of the back-up members 32, 42 to be adjusted to compensate for variations in the width of the middle projection 4.

The two sets of back-up members 32, 42 are essentially identical. Each set includes a first back-up member 32 with opposite faces 39, 40 that are substantially parallel, and a second back-up member 42 with an outer face 50 that is substantially parallel to the faces 39, 40 of the first member 32 and a sloping inner face 48. The members 32, 42 are positioned so that their inner faces 39, 48 confront each other and define a space 52 between them which tapers inwardly toward the projections 4 when the apparatus 14 is in the use position shown in FIGS. 1, 3, and 6-9. The outer faces of the two members 32, 42 form outer abutment surfaces 40, 50 which abut the outer surface portions 5 of the projections 4 when the apparatus 14 is in use. Each member 32, 42 has a hole 34, 44 extending therethrough for receiving the shaft of the bolt 26 for mounting the members 32, 42. The first member 32 has an axial opening 36 extending therethrough, and the second member 42 has an axial opening 46 extending therethrough. When the members 32, 42 are in their use position, these openings 36, 46 are aligned with the holes or openings 6 through the projections 4.

In the preferred embodiment shown in FIGS. 1-9, the first member 32 has an annular flange 38 formed on and projecting axially from its outer face. The flange 38 surrounds the opening 36 and is positioned so that its outer radial surface forms an abutment surface for abutting the radial end surface 9 of a bushing 7 positioned in the corresponding workpiece hole 6 in an under-flush position. This position is illustrated in FIGS. 6-10. As can be seen in these Figs., the term "under-flush" indicates that the radial end surface 9 of the bushing 7 is positioned axially inwardly with respect to the hole 6 and is spaced inwardly from the outer surface portion 5 of the projection 4 onto which the hole 6 opens.

The back-up apparatus 14 also includes a wedge 54 corresponding to each pair or set of back-up members 32, 42. The wedge 54 has a slot 56 extending axially therethrough for mounting the wedge 54 on the bolt 26. The slot 56 is longer than the width of the bolt 26 so that the wedge 54 may be moved upwardly and downwardly (as shown) relative to the bolt 26 and the back-up members 32, 42. The wedge 54 is positioned between the back-up members 32, 42 to slide upwardly and downwardly in the space 52 formed between the members 32, 42. The bottom end of the wedge 54 has a U-shaped opening 58 extending axially therethrough. The opening 58 aligns with the openings 36, 46 in the back-up members 32, 42 when the wedge 54 is in its use position shown in FIGS. 7-9.

The upper end of the wedge 54 has a head 60 formed thereon which projects upwardly and outwardly from the housing 16 to provide a means for actuating the back-up apparatus 14 by moving the wedge 54 upwardly and downwardly. In the embodiment shown in FIGS. 1-9, the wedge 54 is spring loaded downwardly to prevent the wedge 54 from slipping upwardly when a mandrel is pulled through the openings 36, 46, 58. Two strong coil springs 68 have their upper ends attached to opposite sides of the top of the head 60 and their lower ends attached to the side plates 20. The wedge 54 may be moved upwardly against the force of the springs 68 by grasping and pulling the head 60. The preferred embodiment of the apparatus shown in FIGS. 1-9 also includes a mandrel 62 of a known type. The mandrel 62 has an enlarged diameter portion 64 with an outer cylindrical surface that has a diameter greater than the diameter of the holes 8 through the bushings 7. The apparatus also includes means for passing the mandrel 62 through the holes 8 in the bushings 7. This means for passing may take a variety of known forms. In FIGS. 1, 3, and 8, an anvil portion 66 of a known type of mechanism for pulling the mandrel 62 is shown.

FIGS. 11 and 12 show two modified forms of the apparatus shown in FIGS. 1-9. These modified forms are shown and described herein for the purpose of illustrating that the apparatus of the invention may readily be modified and adapted to workpieces having various numbers of axially spaced projections. The parts of the apparatus shown in FIGS. 11 and 12 are denoted by reference characters having identical numerical portions to the corresponding parts of the apparatus shown in FIGS. 1-9. The reference characters in FIG. 11 also include the designation "a", and the reference characters in FIG. 12 include the designation "b". FIG. 11 shows a workpiece 2a having two axially spaced projections 4a. The back-up apparatus 14a shown in FIG. 11 has a single set of back-up members 32a, 42a corresponding to the single pair of adjacent projections 4a. FIG. 12 shows a workpiece 2b with four projections 4b. The back-up apparatus 14b shown in FIG. 12 has three sets of back-up members 32b, 42b corresponding to the three adjacent pairs of projections 4b. As should be apparent, the number of pairs of back-up members may also be greater than three to accommodate workpieces with more than four axially spaced projections. Whatever the number of pairs of back-up members, a spring loading mechanism, such as that shown in FIGS. 1-4, is preferably included.

FIG. 14 shows a modified form of the first back-up member 32d. The member 32d is configured to accommodate the over-flush end of a bushing 7d positioned in an opening in a projection 4d of a workpiece. The member 32d has an opening 36d which is aligned with the opening 8d through the bushing 7d. The outer face of the member 32d forms an abutment surface 40d that abuts the outer surface portions 5d of the projection 4d surrounding the hole in which the bushing 7d is positioned. The outer end of the bushing 7d projects beyond the outer surface portions 5d and terminates in a radial end surface 9d. The end of the bushing 7d is received into a recess 33d formed in the outer face of the member 32d. The radial end surface 9d of the bushing 7d abuts the inner radial surface of the recess 33d. This abutment prevents axial displacement of the bushing 7d when a mandrel is passed through the hole 8d and helps prevent distortion of the outer end of the bushing 7d.

The first back-up member 32 could also be modified to have a flat outer face like the second member 42. In such case, the first member would abut the bushing end 9 in a flush position.

Figure 6:
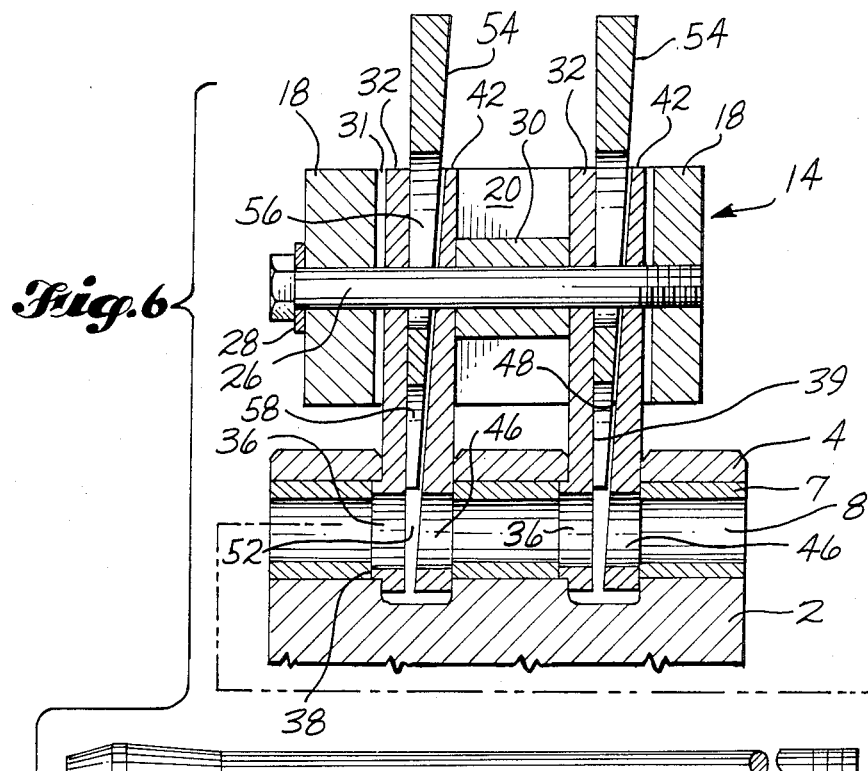
FIG. 6 is like FIG. 5 except that it shows the bushings positioned in the workpiece and the back-up members inserted between the projections of the workpiece.
Figure 7:
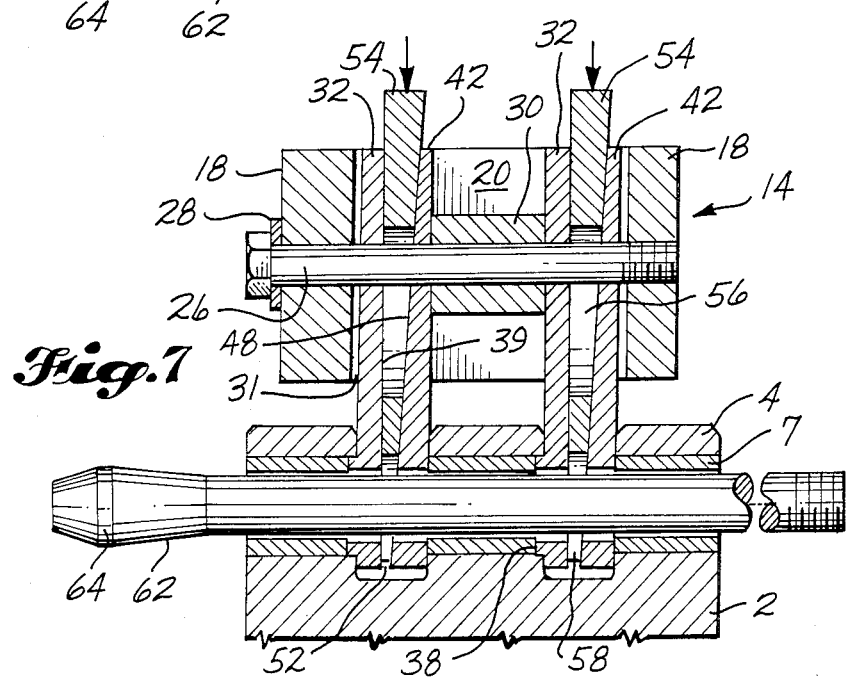
FIG. 7 is like FIG. 6 except that it shows the wedges in their use position and the mandrel ready to be pulled through the bushings.
Figure 8:
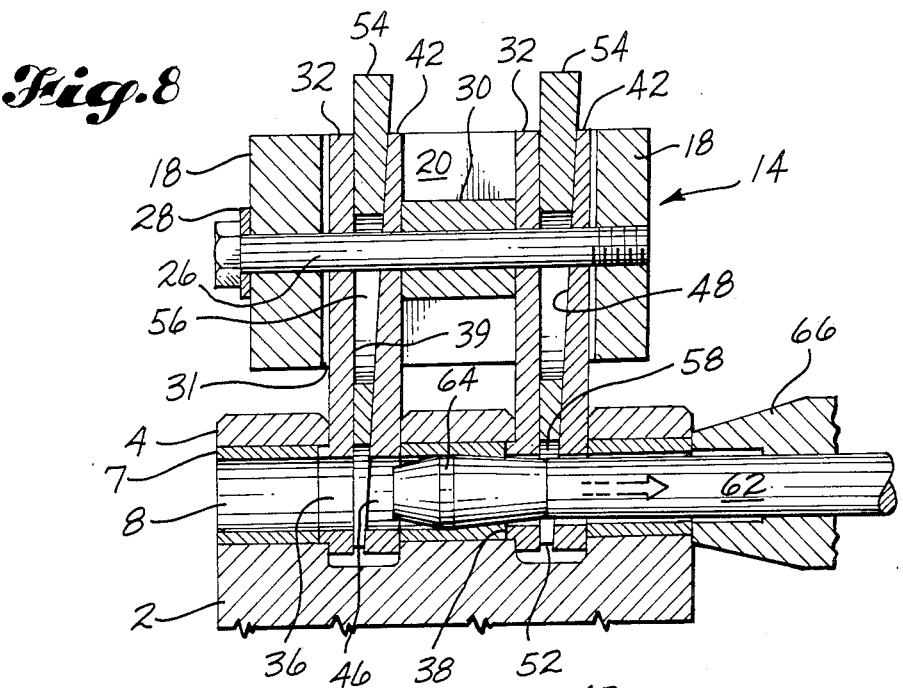
FIG. 8 is like FIG. 7 except that it shows the mandrel pulled partially through the workpiece.

The operation of the apparatus shown in FIGS. 1-9 and the carrying out of the first preferred embodiment of the method of the invention are illustrated in FIGS. 1-10. A bushing 7 is positioned in the hole 6 in each of the projections 4 of the workpiece 2. Then a pair of back-up members 32, 42 is inserted between each adjacent pair of projections 4, as shown in FIG. 6. The members 32, 42 are positioned so that the axial openings 36, 46 through the members 32, 42 are aligned with the holes 6, 8 in the projections 4 and the bushings 7, the outer abutment surfaces 40, 50 of the members 32, 42 are aligned with the outer surface portions 5 of the projections 4 surrounding the holes 6 and the radial end surfaces 9 of the bushings 7, and the flanges 38 of the back-up members 32 project into the corresponding holes 6. While the back-up members 32, 42 are being inserted and positioned, the operator grips the wedge head 60 and holds the wedge 54 in the upward position shown in FIG. 6.

When the back-up members 32, 42 have been positioned, the head 60 is released to allow the springs 68 to drive the wedge 54 downwardly in the space 52 defined between the confronting faces 39, 48 of the corresponding pair of back-up members 32, 42. The springs 68 may be assisted by manual pressure and/or a light tap with a rubber mallet. The wedge 54 is moved from the position shown in FIG. 6 to the position shown in FIGS. 1, 3, and 7-9.

Figure 9:
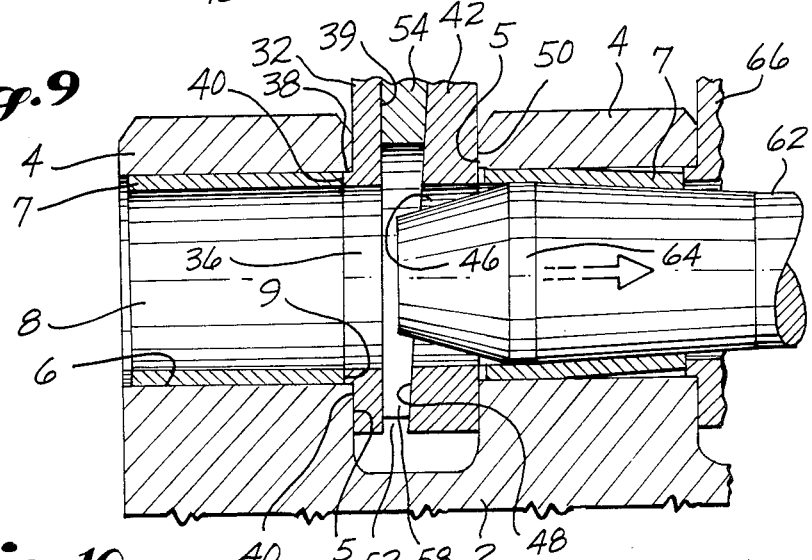
FIG. 9 is an enlarged fragmentary view showing the mandrel approximately in the position shown in FIG. 8.

Driving the wedge 54 downwardly between the confronting faces 39, 48 forces the outer abutment surfaces 40, 50 firmly against the outer surface portions 5 of the projections 4 surrounding the holes 6, and the outer radial end surface of the flange 38 against the radial end surface 9 of the adjacent bushing 7. As can be seen in FIGS. 7-9, when the wedge 54 is in its downward use position, the opening 58 extending through the wedge 54 is aligned with the openings 36, 46 through the back-up members 32, 42 and the holes 6, 8 through the projections 4 and the bushings 7. Referring to FIG. 9, the abutment surfaces 40, 50 need only abut the radial end surfaces 9 of the bushings 7 at the mandrel exit ends of the holes 6. The abutment surface 50 of the second back-up member 42, which faces a mandrel entry end of a hole 6, may be spaced from the adjacent bushing 7, as shown in FIG. 9.

After the back-up members 32, 42 have been positioned, the mandrel 62 is positioned so that its narrow portion extends through the bushings 7 and the openings 36, 46 through the back-up members 32, 42, as shown in FIG. 7. The U-shaped configuration of the openings 58 through the wedges 54 allows the mandrel 62 to be so positioned either before or after the wedges 54 are moved downwardly. When the back-up members 32, 42, the wedges 54, and the mandrel 62 are in the positions shown in FIG. 7, the mandrel 62 is pulled through the bushings 7 and the openings 36, 46, 58 so that its enlarged diameter portion 64 expands the bushings 7 radially and circumferentially, as shown in FIGS. 8 and 9. The expanding of the bushings 7 is most clearly illustrated in FIG. 9. While the mandrel 62 is being pulled, the abutment surfaces 40, 50, including the outer radial end surfaces of the flanges 38, provide firm back-up for the mandrel exit ends of the holes 6 and bushings 7 between the projections 4. The mandrel work surface 64 may be sized to expand the bushings 7 into tight engagement with the workpiece holes 6 without expanding the holes 6. Alternatively, if it is necessary and/or desirable to also expand the holes 6 in the workpiece projections 4, such as to improve their fatigue life, the mandrel work surface 64 may be sized to radially and circumferentially expand the holes 6 to coldwork the holes 6 when the mandrel 62 is pulled through the bushings 7.

Figure 10:
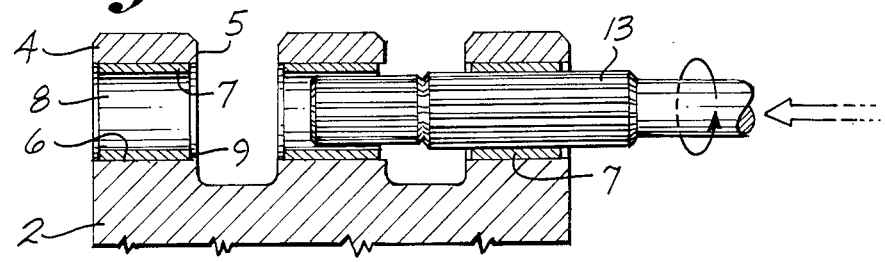
FIG. 10 is a sectional view illustrating the reaming of the bushings after they are installed.

Following the completion of the step of expanding the bushings 7 illustrated in FIGS. 8 and 9, the inner circumferential surfaces of the bushings 7 have a very slightly tapered configuration with the diameter at the mandrel entry end being slightly larger than the diameter at the mandrel exit end. In some installations, this slight irregularity is acceptable. However, in other installations very precise sizing of the bushings 7 is required. In such case, the method preferably further includes reaming the bushings 7 after the bushings 7 are expanded. A reamer 13 of a known type is shown in FIG. 10 being used to ream the bushings 7 to precisely size the bushings 7.

FIG. 13 shows a workpiece 2c into which bushings 7c have been installed in accordance with the method described above. The workpiece 2c has four knuckle-like axially spaced projections 4c into each of which a bushing 7c has been installed. As shown in FIG. 13, after the bushings 7c have been installed, the workpiece 2c may be joined to a mating knuckle structure 10c by means of a pin 12c that extends through the bushings 7c and aligned holes through the knuckles on the structure 10c. FIG. 13 shows bushings 7c installed only in the workpiece 2c and not in the mating structure 10c. In some situations, it would be desirable to also install bushings in the mating structure 10c. This could be easily done by carrying out the method described above.

A second preferred embodiment of the method and apparatus of the invention are illustrated in FIGS. 15–18. This embodiment is designed for installing bushings in workpieces such as the turbine rotor 102 shown in FIGS. 15–18. The rotor 102 has three axially spaced projections 104 through which a plurality of holes 106 extend axially. There are a plurality of rows of axially aligned holes 106. Each row is adapted to receive a pin (not shown) for attaching a mating knuckle-like blade root to the rotor 102.

Like the embodiment shown in FIGS. 1-9, the embodiment of FIGS. 15–18 includes back-up apparatus 114 which has two sets of back-up members 132, 142. A wedge 154 is provided for each of the sets of back-up members 132, 142. The wedge 154 interacts with the back-up members 132, 142 in the same manner as in the first preferred embodiment described above. The actuating mechanism for the wedges 154 is shown in FIGS. 15–17. A pneumatic cylinder 80 is provided for each of the wedges 154. Pressurized air is delivered to the cylinder 80 through air lines 82 to move a piston 84 inside the cylinder 80 upwardly and downwardly. A piston rod 86 extends from the piston 84 and has an outer end which is operably connected to the wedge 154 by means of a clevis 88. The shape of the clevis 88 is most clearly seen in FIG. 18. A vertical hole 90 extends through the clevis 88 for receiving the outer end of the piston rod 86. The clevis 88 extends horizontally from the piston rod 86 and terminates in a forked end. A horizontal slot 91 and a vertical slot 92, which intersects the horizontal slot 91, extend through the forked end. The vertical slot 92 is dimensioned to receive a lug 155 formed on the top of the wedge 154. A pin 93 extends through a suitable hole in the lug 155 and is received into the horizontal slot 91 to attach the wedge 154 to the clevis 88.

Referring to FIGS. 15–17, the outer ends of the forks of the clevis 88 formed by the slots 91, 92 are received into a mounting plate 95. The plate 95 has an opening 97 formed therein for accommodating upward and downward movement of the clevis 88 and wedge 154. The lower portions of the wedge 154 and the back-up members 132, 142 are housed by the mounting plate 95 and a face plate 94 which is attached to the mounting plate 95 by means of fasteners 96. As can be seen in FIGS. 15 and 17, the apparatus of this embodiment includes mirror image actuating and mounting mechanisms for the two sets of back-up members 132, 142 and wedges 154.

Figure 18:
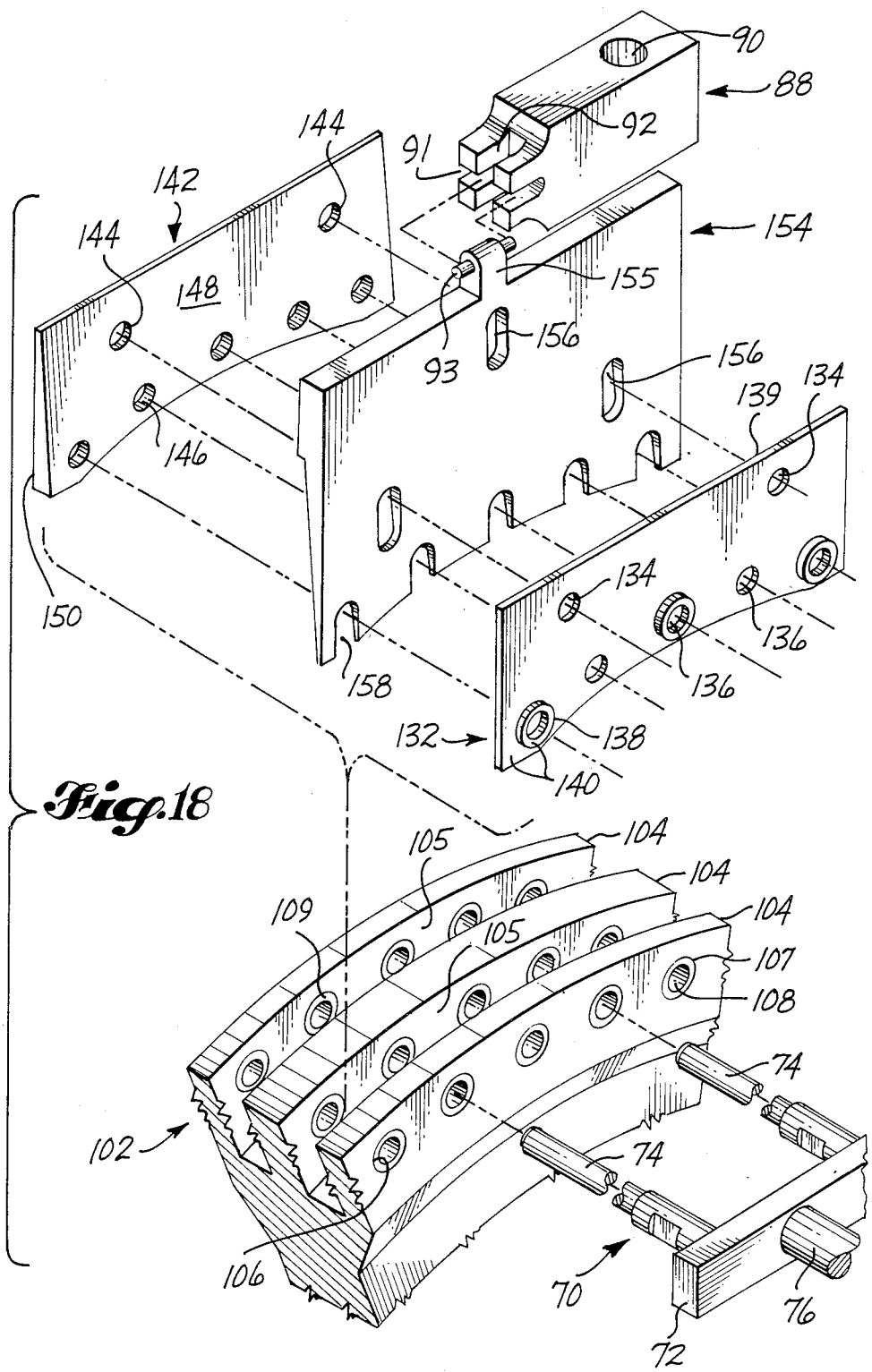
FIG. 18 is an exploded pictorial view of a portion of the apparatus shown in FIGS. 15 and 16.

The details of the structure of the back-up members 132, 142 can be seen in FIG. 17 and most clearly in FIG. 18. Each set of back-up members 132, 142 includes a first member 132 which, like the back-up member 32 of the first embodiment, has substantially parallel inner and outer faces 139, 140. The member 132 has two upper holes 134 for receiving the fasteners 96 to attach the member 132 to the plates 94, 95. Five openings 136 extend through the lower portion of the member 132. The openings 136 are arranged to align with the holes 106 in five adjacent rows of holes 106 in the rotor 102. As shown in FIG. 18, the first, third, and fifth openings 136 may be provided with flanges 138 for abutting the radial end surfaces 109 of bushings 107 in an under-flush position, as described above. The outer radial surfaces of the flanges 138 and the outer face of the member 132 surrounding the openings 136 form an abutment surface 140.

Each set of tack-up members 132, 142 also includes a second tapered member 142. The inner face 148 of the member 142 slopes in an inward direction (toward the rotor 102) away from its outer abutment surface 150. Like the first member 132, the second member 142 has two holes 144 for receiving the fasteners 96 and five openings 146 arranged to align with adjacent rows of holes 106 in the rotor 102.

The wedge 154 has the same width as the back-up members 132, 142 but is longer in the vertical direction for mounting to the clevis 88, as described above. The wedge 154 has three slots 156 formed therein for receiving three of the fasteners 96 which attach the face plate 94 to the mounting plate 95. The vertical length of the slots 156 is dimensioned to allow the required vertical movement of the wedge 154 relative to the plates 94, 95 and the back-up members 132, 142. On the bottom edge of the wedge 154, five openings 158 extend horizontally therethrough. These openings 158 are arranged to align with the openings 136, 146 in the back-up members 132, 142 and open onto the lower edge of the wedge 154 so that the wedge 154 may be positioned in alignment after a locating rod 74, described below, has been positioned in one or more of the rows of holes 106.

The preferred embodiment of the apparatus shown in FIGS. 15–18 also includes a locator 70. The locator 70 has a base 72 with a first side from which two parallel locating rods 74 project, and an opposite second side from which a handle 76 projects. The rods 74 are positioned and dimensioned to extend through each hole 106 in two rows of holes 106 in the rotor 102 separated by a third row of holes 106. When the back-up members 132, 142 are positioned between the projections 104 of the rotor 102 with their holes 136, 146 in alignment with the projection holes 106, and the locating rods 74 are extended through two rows of holes 106, the rods 74 hold the openings 136, 146 in each of the five rows in accurate alignment with the holes 106.

The operation of the second preferred embodiment is as follows. A bushing 107 is positioned in each hole 106 in at least the first, third, and fifth rows of holes 106 in a group of five adjacent rows of holes 106. The workpiece 102 and the back-up apparatus 114 are then positioned relative to each other as shown n FIGS. 15 and 16. The positioning includes inserting a pair of back-up members 132, 142 between each adjacent pair of projections 104, and aligning, in each of the five rows of holes 106, the axial openings 136, 146 through the back-up members 132, 142 with the workpiece holes 106. In addition, in the first, third, and fifth rows, the outer abutment surfaces 140, 150 of the back-up members 132, 142 are aligned with the radial end surfaces 109 of the bushings 107 and the outer surface portions 105 of the projections 104 surrounding the holes 106. The locating rods 74 are positioned to extend through each hole 106 in the second and fourth rows to hold the openings 136, 146 in the back-up members 132, 142 in accurate alignment with the holes 106 in each of the five rows. When the back-up members 132, 142 and the locating rods 74 have been positioned, the wedge 154 is driven by the piston rod 86 downwardly into the tapered space between the inner confronting faces 139, 148 of the back-up members 132, 142. The movement of the wedge 154 forces the outer abutment surfaces 140, 150 of the back-up members 132, 142 firmly against the projection outer surface portions 105. When the wedge 154 is driven into place, the openings 158 through the wedge 154 move into alignment with the workpiece holes 106 and the back-up member openings 136, 46. The aligned position is shown in FIG. 17. With the back-up apparatus 114 providing firm back-up for the ends of the holes 106 and radial ends 109 of the bushings 107 between the projections 104, a mandrel 162 is pulled through the holes 108 in the bushings 107 and the openings 136, 146 in the back-up members 132, 142 in each of the first, third, and fifth rows. The pulling of the mandrel 162 is illustrated in FIG. 17. The mandrel 162 is pulled toward the side of the workpiece 102 opposite the locator 70 to avoid interference between the locator 70 and the mandrel pulling mechanism. As in the first embodiment, the mandrel 162 radially and circumferentially expands the bushings 107 into tight engagement with the holes 106. The mandrel 162 may be sized to install the bushings without expanding the holes 106 or to expand and cold-work the holes 106 as the bushings 107 are installed. The apparatus for pulling the mandrel 162 and for providing back-up for the final mandrel exit end of the holes 106 may take any number of known forms and will not be described herein except to note that it would include an anvil, such as the anvil 66 shown in FIGS. 1, 3, and 8.

After the bushings 107 in the first, third, and fifth rows have been expanded, the locating rods 74 are removed from the second and fourth rows and repositioned. The rods 74 could be repositioned without repositioning the back-up members 132, 142, in order to allow expanding of the bushings 107 in the second and fourth rows, without departing from the scope of the invention. However, the preferred embodiment shown in FIGS. 15–18 is designed to be most efficiently used by repositioning the back-up members 132, 142 relative to the workpiece 102, after removing the rods 74, to allow working of three additional rows of holes 106, including the original second and fourth rows. For example, the back-up members 132, 142 might be shifted one row and the rods 74 repositioned in the rows then corresponding to the second and fourth openings 136, 146 in the back-up members 132, 142. The expanding and repositioning process is repeated until all the required bushings 107 have been installed in the workpiece 102. If desired, the bushing holes 108 may be reamed after the bushings 107 have been installed, either one row at a time or following the installation of all the bushings 107, to accurately size the bushings 107.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A method of providing firm, back-up for a mandrel exit end of a hole located between two axially spaced projections of a workpiece, said hole extending axially through one of the projections, said method comprising:
    inserting between the projections a pair of back-up members having confronting faces that define a space therebetween which tapers inwardly toward the projections; and positioning the members to align axial openings therethrough with said hole, and to align abutment surfaces thereof with outer surface portions of the projections; and
    driving a wedge between said confronting faces to force said abutment surfaces firmly against said outer surface portions, and aligning an opening through the wedge with said hole and said openings through the back-up members.

2. A method as recited in claim 1, in which said hole is formed by an axial hole through a bushing positioned in an axial opening through said one of the projections; and in which the step of positioning the back-up members includes aligning a portion of said abutment surfaces with a radial end surface of the bushing.

3. A method as recited in claim 2, in which said portion of said abutment surfaces is positioned to project into said opening through said one of the projections, to back up the bushing in an under-flush position.

4. A method of installing a bushing in an axial hole that extends axially through one of two axially spaced projections of a workpiece and of providing firm back-up for a radial end surface of the bushing at a mandrel exit end of said hole, said method comprising;
    positioning the bushing in said hole;
    inserting the projections a pair of back-up members having confronting faces that define a space therebetween which tapers inwardly toward the projections; and positioning the members to align axial openings therethrough with said hole, and to align abutment surfaces thereof with said radial end surface of the bushing and outer surface portions of the projections;
    driving a wedge between said confronting faces to force said abutment surfaces firmly against said outer surface portions, and aligning an opening through the wedge with said hole and said openings through the back-up members; and
    then passing a mandrel through the bushing and said openings through the back-up members to radially and circumferentially expand the bushing; and, while passing the mandrel, allowing said abutment surfaces to firmly abut said radial end surface.

5. A method as recited in claim 4, in which a portion of said abutment surfaces is positioned to project into said hole, to install the bushing in an under-flush position.

6. A method as recited in claim 4, further comprising reaming the bushing after passing the mandrel, to size the bushing.

7. A method as recited in claim 4, in which the step of passing the mandrel radially and circumferentially expands said hole to coldwork said hole.

8. A method of installing bushings in axially aligned holes that extend axially through a plurality of axially spaced projections of a workpiece and of providing firm back-up for radial end surfaces of the bushings at mandrel exit ends of said holes, said method comprising:
    positioning a bushing in each said hole;
    inserting between each adjacent pair of said projections a pair of back-up members having confronting faces that define a space therebetween which tapers inwardly toward the projections; and positioning the members to align axial openings therethrough with said holes, and to align abutment surfaces thereof with said radial end surfaces of the bushings and outer surface portions of the projections surrounding said holes;
    driving a wedge between said confronting faces to force said abutment surfaces firmly against said outer surface portions, and aligning an opening through the wedge with said holes and said openings through the back-up members; and
    then pulling a mandrel through the bushings and said openings through ,the back-up members to radially and circumferentially expand the bushings; and, while pulling the mandrel, allowing said abutment surfaces to firmly abut said radial end surfaces.

9. A method as recited in claim 8, in which a portion of said abutment surfaces is positioned to project into one of said holes, to install the bushing positioned in said one of said holes in an under-flush position.

10. A method as recited in claim 8, further comprising reaming the bushings after pulling the mandrel, to size the bushings.

11. A method as recited in claim 8, in which the step of pulling the mandrel radially and circumferentially expands said holes to coldwork said holes.

12. A method of installing bushings in a plurality of rows of axially aligned holes that extend axially through a plurality of axially spaced projections a workpiece and of providing firm back-up for radial end surfaces of the bushings at mandrel exit ends of said holes, said method comprising:
    positioning a bushing in each said hole;
    inserting between each adjacent pair of said projections a pair of back-up members having confronting faces that define a space therebetween which tapers inwardly toward the projections; and positioning the members to align, in each said row, axial openings therethrough with said holes;
    in each of two of said rows, positioning a locating rod to extend through each said hole in the row to hold said openings in accurate alignment with said holes in each of said rows;
    while positioning the members, aligning, in at least each row other than said two of said rows, abutment surfaces of the back-up members with said radial end surfaces of the bushings and outer surface portions of the projections surrounding said holes;

after positioning the back-up members and the locating rods, driving a wedge between said confronting faces to force said abutment surfaces firmly against said outer surface portions, and, in each said row, aligning an opening through the wedge with said holes and said openings through the back-up members;

after driving the wedge, pulling a mandrel through the bushings and said openings through the back-up members in each said row in which a locating rod has not been positioned, to radially and circumferentially expand the bushings; and, while pulling the mandrel, allowing said abutment surfaces to firmly abut said radial end surfaces;

removing the locating rods from said two of said rows, and repositioning each locating rod to extend through each said hole in a different row; and pulling a mandrel through the bushings in each of said two rows to radially and circumferentially expand the bushings.

13. A method as recited in claim 12, further comprising reaming the bushings after pulling the mandrel, to size the bushings.

14. A method as recited in claim 12, in which the steps of pulling a mandrel radially and circumferentially expand said holes to coldwork said holes.

15. Apparatus for providing firm back-up for a mandrel exit end of a hole located between two axially spaced projections of a workpiece, said hole extending axially through one of the projections, said apparatus comprising:

a pair of back-up members having outer abutment surfaces and inner confronting faces; each said member having an opening extending axially therethrough; and said members being shaped and dimensioned to be insertable between the projections with their confronting faces defining a space therebetween which tapers inwardly toward the projections, with said openings aligned with said hole, and with said abutment surfaces aligned with outer surface portions of the projections; and a wedge having an opening extending therethrough; said wedge being shaped and dimensioned to force said abutment surfaces firmly against said outer surface portions, and to align said opening in the wedge with said openings in the back-up members, when the wedge is driven between said confronting faces.

16. Apparatus as recited in claim 15, in which the confronting face and outer abutment surface of one of said members are substantially parallel, and the confronting face of the other of said members slopes in an inward direction away from its outer abutment surface.

17. Apparatus as recited in claim 15, in which the abutment surface of one of said members is shaped and dimensioned to abut a radial end surface of a bushing positioned in said hole.

18. Apparatus as recited in claim 17, in which said one of said members has an annular flange formed thereon positioned and dimensioned to project into said hole to abut said radial end surface in an under-flush position.

19. Apparatus as recited in claim 17, in which said one of said members has a recess formed therein for receiving said radial end surface in an over-flush position.

20. Apparatus for installing a bushing in an axial hole that extends axially through one of two axially spaced projections of a workpiece, said apparatus comprising:

a pair of back-up members having outer abutment surfaces and inner confronting faces; each said member having an opening extending axially therethrough; and said members being shaped and dimensioned to be insertable between the projections with their confronting faces defining a space therebetween which tapers inwardly toward the projections, with said openings aligned with said hole, and with said abutment surfaces aligned with a radial end surface of the bushing and outer surface portions of the projections; and a wedge having an opening extending therethrough; said wedge being shaped and dimensioned to force said abutment surfaces firmly against said radial end surface and said outer surface portions, and to align said opening in the wedge with said openings in the back-up members, when the wedge is driven between said confronting faces;

a mandrel; and means for passing the mandrel through the bushing and said openings in the back-up members to radially and circumferentially expand the bushing.

21. Apparatus as recited in claim 20, in which the confronting face and outer abutment surface of one of said members are substantially parallel, and the confronting face of the other of said members slopes in an inward direction away from its outer abutment surface.

22. Apparatus as recited in claim 20, in which one of said members has an annular flange formed thereon positioned and dimensioned to project into said hole to abut said radial end surface in an under-flush position.

23. Apparatus for installing bushings in a plurality of rows of axially aligned holes that extend axially through a plurality of axially spaced projections of a workpiece, said apparatus comprising:

a pair of back-up members corresponding to each pair of adjacent projections; said members having outer abutment surfaces and inner confronting faces; each said member having an opening extending axially therethrough for each said row; and said members being shaped and dimensioned to be insertable between the projections in the corresponding pair of projections with their confronting faces defining a space therebetween which tapers inwardly toward the projections, with said openings aligned with said holes in the corresponding rows, and with said abutment surfaces aligned with radial end surfaces of the bushings and outer surface portions of the projections; and a wedge corresponding to each pair of back-up members, said wedge having an opening extending therethrough for each said row; and said wedge being shaped and dimensioned to force said abutment surfaces firmly against said radial end surfaces and said outer surface portions, and to align said openings in the wedge with said openings in the back-up members, when the wedge is driven between said confronting faces;

a locator having two rods each of which is positioned and dimensioned to extend through said holes in one of said rows, to hold said openings and said holes in each of said rows in accurate alignment;

a mandrel; and means for passing the mandrel through the bushings and said openings in the back-up members in each said row to radially and circumferentially expand the bushings.

24. Apparatus as recited in claim 23, in which, in each said pair of back-up members, the confronting face and outer abutment surface of one of said members are substantially parallel, and the confronting face of the other of said members slopes in an inward direction away from its outer abutment surface.

25. Apparatus as recited in claim 23, in which one of said members has, for at least one of said rows, an annular flange formed thereon positioned and dimensioned to project into one of said holes in the row to abut said radial end surface in an under-flush position.

26. Apparatus as recited in claim 23, in which the locator comprises a base having a first side from which the rods project, and an opposite second side from which a handle projects.

* * * * *

UNITED STATES PATENT AND TRADEMARK OFFICE
CERTIFICATE OF CORRECTION

PATENT NO. : 4,809,420

DATED : March 7, 1989

INVENTOR(S) : M. A. Landy, T. L. Thompson and L. L. Wiemann

It is certified that error appears in the above-identified patent and that said Letters Patent is hereby corrected as shown below:

In the Abstract, 2nd line, "projection" should be -- projections --.

Column 5, line 63, delete the numeral "5".

Column 10, lines 9 and 10, "The preferred" should begin a new paragraph.

Column 12, lines 50 and 51, "The actuating" should begin a new paragraph.

Column 13, line 31, "tack-up" should be -- back-up --.

Column 14, line 6, "n" should be -- in --.

Column 14, line 20, "When" should begin a new paragraph.

Column 14, line 31, "136, 46" should be -- 136, 146 --.

Column 14, line 32, "With the" should begin a new paragraph.

Claim 1, column 15, first line of claim, delete the comma after "firm".

Claim 4, column 15, line 49, "comprising;" should be -- comprising: --.

Claim 4, column 15, line 51, following "inserting", insert -- between --.

UNITED STATES PATENT AND TRADEMARK OFFICE
CERTIFICATE OF CORRECTION

PATENT NO. : 4,809,420

DATED : March 7, 1989

INVENTOR(S) : M.A.Landy, et al.

It is certified that error appears in the above-identified patent and that said Letters Patent is hereby corrected as shown below:

Claim 8, column 16, line 32, delete the comma after "through".

Claim 12, column 16, line 48, after "projections" insert --of--.

Signed and Sealed this

Fourth Day of December, 1990

Attest:

HARRY F. MANBECK, JR.

*Attesting Officer*     *Commissioner of Patents and Trademarks*